(12) United States Patent
Ryu et al.

(10) Patent No.: US 9,326,319 B2
(45) Date of Patent: Apr. 26, 2016

(54) MOBILE TERMINAL

(71) Applicant: LG ELECTRONICS INC., Seoul (KR)

(72) Inventors: Seungwoo Ryu, Seoul (KR); Songyi Lee, Seoul (KR); Chisang You, Seoul (KR); Jaehyun Choi, Seoul (KR); Kyoungsun Hwang, Seoul (KR); Byungeun Jeon, Seoul (KR); Jina Park, Seoul (KR); Soyeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 13/796,566

(22) Filed: Mar. 12, 2013

(65) Prior Publication Data

US 2013/0267284 A1    Oct. 10, 2013

Related U.S. Application Data

(60) Provisional application No. 61/609,954, filed on Mar. 13, 2012.

(30) Foreign Application Priority Data

Nov. 20, 2012  (KR) .................. 10-2012-0131888

(51) Int. Cl.
*H04M 1/00* (2006.01)
*H04W 88/06* (2009.01)
*H04B 1/04* (2006.01)
*H04B 1/18* (2006.01)
*H04B 1/3888* (2015.01)
*H01Q 9/04* (2006.01)
*H01Q 5/371* (2015.01)

(52) U.S. Cl.
CPC ............... *H04W 88/06* (2013.01); *H01Q 5/371* (2015.01); *H01Q 9/0442* (2013.01); *H04B 1/0458* (2013.01); *H04B 1/18* (2013.01); *H04B 1/3888* (2013.01)

(58) Field of Classification Search
CPC ......... H01Q 1/243; H01Q 1/36; H01Q 21/24; H01Q 9/27; H01Q 21/28; H01Q 1/38; H01Q 5/371; H01Q 9/42; H01Q 1/48
USPC ....................................................... 455/575.1
See application file for complete search history.

(56) References Cited

U.S. PATENT DOCUMENTS

| 7,304,611 | B2* | 12/2007 | Yuanzhu | H01Q 9/0442 343/700 MS |
| 2009/0128428 | A1* | 5/2009 | Ishizuka | H01Q 1/243 343/702 |
| 2011/0316650 | A1* | 12/2011 | Park | H01P 1/2053 333/203 |

* cited by examiner

*Primary Examiner* — Ajibola Akinyemi
(74) *Attorney, Agent, or Firm* — Birch, Stewart Kolasch & Birch, LLP

(57) ABSTRACT

A mobile terminal includes a conductive member configured to radiate radio signals, and a blocking portion configured to mismatch impedance in a third frequency band between a first frequency and a second frequency when the conductive member multi-resonates between the first frequency and the second frequency.

4 Claims, 14 Drawing Sheets

MOBILE TERMINAL

CROSS-REFERENCE TO RELATED APPLICATION

Pursuant to 35 U.S.C. §119(e), this application claims the benefit of priority from U.S. Provisional Patent Application Ser. No. 61/609,954, filed on Mar. 13, 2012, the contents of which is hereby incorporated by reference herein in its entirety. In addition, pursuant to 35 U.S.C. §119(d), this application claims the benefit of priority from Korean Application No. 10-2012-0131888, filed on Nov. 20, 2012, the contents of which is hereby incorporated by reference herein in its entirety.

BACKGROUND OF THE INVENTION

1. Field of the Invention

The present invention relates to a mobile terminal, and particularly, to a mobile terminal having an antenna device which transmits and receives radio signals.

2. Background of the Invention

A mobile terminal is a portable electronic device that can be carried anywhere and have at least one function of performing voice and video calls, inputting/outputting information, storing data, etc.

As the mobile terminal becomes multifunctional, the mobile terminal can be allowed to capture still images or moving images, play music or video files, play games, receive broadcast, etc., so as to be implemented as an integrated multimedia player.

Various attempts have been made to implement complicated functions in such a multimedia device by means of hardware or software. For instance, is being provided a user interface (UI) environment for allowing a user to search for or select a function in easier and more convenient manners.

Besides such attempts, a method for enhancing a function of hardware may be considered. Such method includes structural changes and improvements for allowing a user to conveniently use the mobile terminal. As the structural changes and improvements, an antenna capable of transmitting and receiving (transceiving) electric waves may be considered.

An antenna is a device configured to transmit and receive (transceive) radio electromagnetic waves for radio communications, which is an absolutely-required component of the mobile terminal. The mobile terminal is provided with various functions such as WiBro and DMB, rather than a voice call. Therefore, the antenna should implement bandwidths for satisfying such functions, and should be designed to have a small size so as to be mounted in the mobile terminal.

To meet such demand, antennas capable of implementing multi frequency bands are being designed. However, the antennas have complicated structures, and it is difficult to independently control parameter values which determine antenna characteristics such as the resonant frequency, the bandwidth and the gain. In order to solve such problems, research on an antenna having a new structure is actively ongoing.

SUMMARY OF THE INVENTION

Therefore, an aspect of the detailed description is to provide a mobile terminal having an antenna with more enhanced efficiency and a smaller size.

Another aspect of the detailed description is to provide a mobile terminal having an antenna capable of transmitting and receiving radio electromagnetic signals in a multi-frequency band.

To achieve these and other advantages and in accordance with the purpose of this specification, as embodied and broadly described herein, there is provided a mobile terminal, comprising: a conductive member configured to radiate radio signals; and a first blocking portion configured to mismatch impedance in a third frequency band between a first frequency and a second frequency when the conductive member multi-resonates between the first frequency and the second frequency.

According to an embodiment of the present invention, the mobile terminal may further comprise a feeding portion configured to feed the conductive member, and the first blocking portion may be disposed between the feeding portion and the conductive member.

According to an embodiment of the present invention, the first blocking portion may be implemented as a lumped-element having a capacitor or an inductor.

According to an embodiment of the present invention, the mobile terminal may further comprise a substrate having a ground; and a connection portion formed between the conductive member and the substrate, and electrically connected to the substrate.

According to an embodiment of the present invention, the mobile terminal may further comprise a second blocking portion formed between the connection portion and the substrate, and configured to mismatch impedance in a frequency band lower than the first frequency.

According to an embodiment of the present invention, the mobile terminal may further comprise a second blocking portion formed between the connection portion and the substrate, and configured to mismatch impedance in a frequency band higher than the second frequency.

According to an embodiment of the present invention, the second blocking portion may be implemented as a lumped-element having a capacitor or an inductor.

According to an embodiment of the present invention, the conductive member may be formed to have a length corresponding to $\lambda/8 \sim \lambda/12$ of the first frequency.

According to an embodiment of the present invention, the conductive member may be formed such that current applied thereto flows in a single direction, from one end to another end, or from another end to one end thereof.

According to an embodiment of the present invention, the conductive member may be formed to have no branch where current applied thereto is branched off.

According to an embodiment of the present invention, a hole may be penetratingly-formed at the conductive member, and the hole may be disposed close to the feeding portion.

According to another aspect of the present invention, there is provided a mobile terminal, comprising: a conductive member; a feeding portion configured to feed the conductive member; and a blocking portion disposed between the conductive member and the feeding portion, and configured to mismatch impedance in a frequency band adjacent to one of a plurality of frequencies when the conductive member resonates at the plurality of frequencies.

According to an embodiment of the present invention, the blocking portion may be formed in plurality in number.

According to an embodiment of the present invention, the mobile terminal may further comprise a substrate having a ground; and a connection portion formed between the conductive member and the substrate, and feed-connected to the substrate.

According to an embodiment of the present invention, the first blocking portion may be configured to electrically connect the conductive member and the connection portion with each other, and the second blocking portion may be configured to electrically connect the substrate and the connection portion with each other.

According to still another aspect of the present invention, there is provided a mobile terminal, comprising: a substrate having a ground; a conductive member spaced from the substrate; a connection portion disposed between the substrate and the conductive member; a blocking portion disposed between the conductive member and the connection portion, and configured to mismatch impedance at a first frequency band; and a matching portion formed between the substrate and the connection portion, and configured to match impedance of the conductive member at a second or third frequency adjacent to the first frequency band.

The mobile terminal according to at least an embodiment of the present invention may have the following advantages.

Firstly, since the mobile terminal is provided with the blocking portion, an antenna characteristic can be enhanced at a frequency adjacent to a blocking frequency band.

Secondly, an antenna which resonates at a low frequency can be implemented using a shorter conductive member, by a frequency shift effect.

Thirdly, a body effect can be reduced due to the blocking frequency band.

Fourthly, in a case where the conductive member is provided with no branch, a user's specific absorption rate (SAR) can be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal of the present disclosure will be explained in more detail with reference to the attached drawings. The suffixes "module" and "unit or portion" for components used in the following description merely provided only for facilitation of preparing this specification, and thus they are not granted a specific meaning or function. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
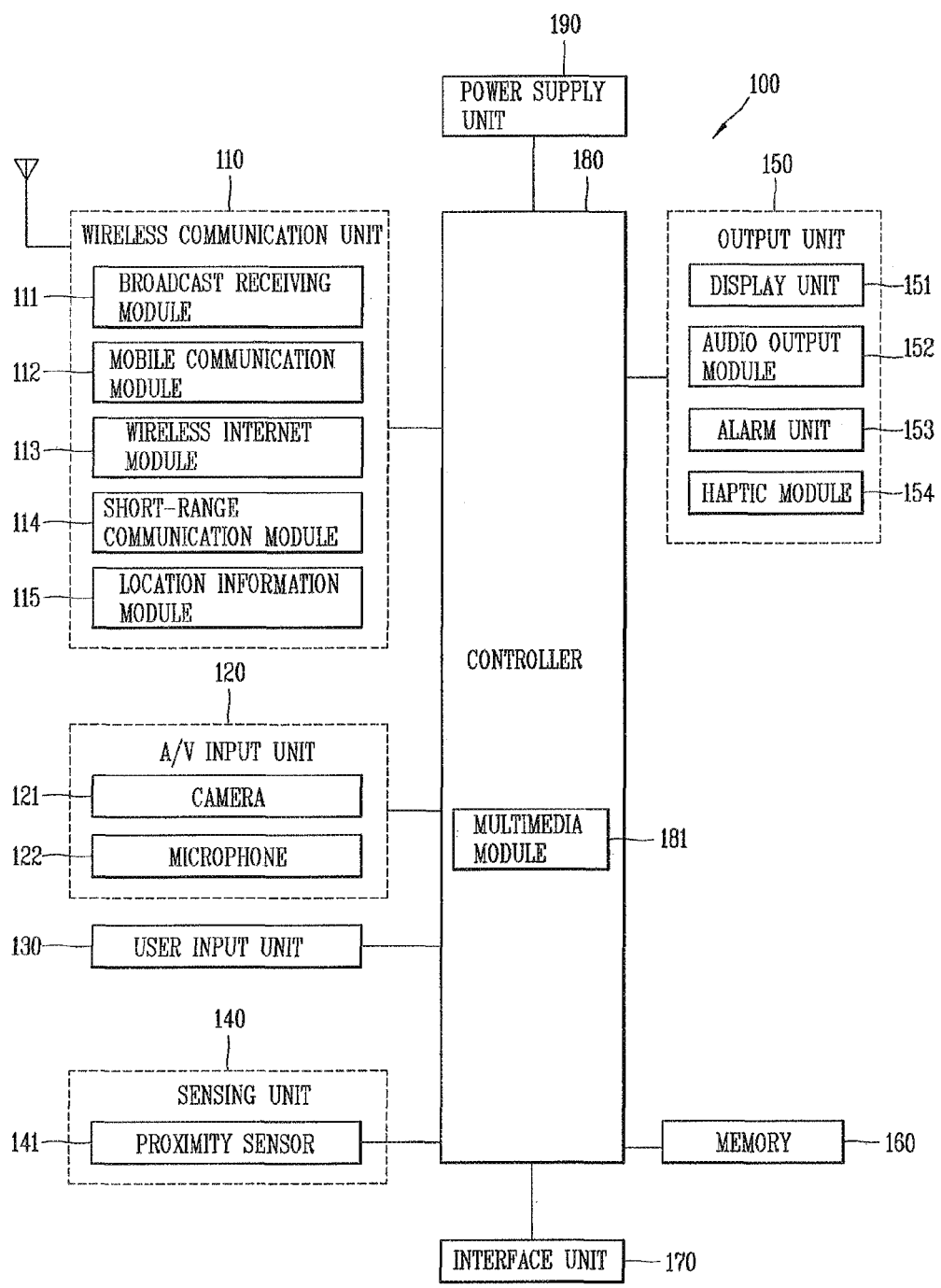
FIG. 1 is a block diagram of a mobile terminal according to an embodiment of the present invention.

The mobile terminal 100 may comprise components, such as a wireless communication unit 110, an Audio/Video (NV) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the NV input unit 120 is configured to receive an audio or video signal. The NV input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
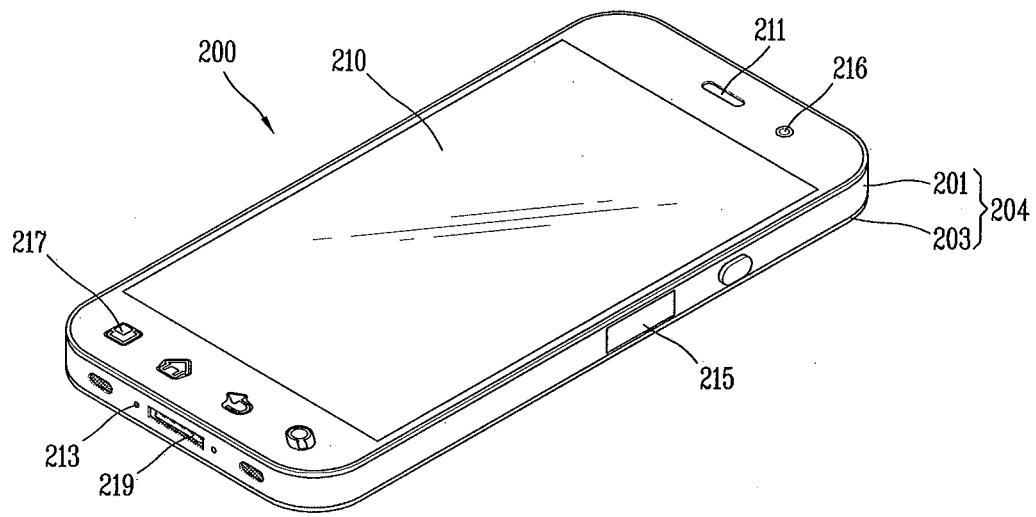
FIG. 2 is a front perspective view of a mobile terminal according to an embodiment of the present invention.
Figure 3:
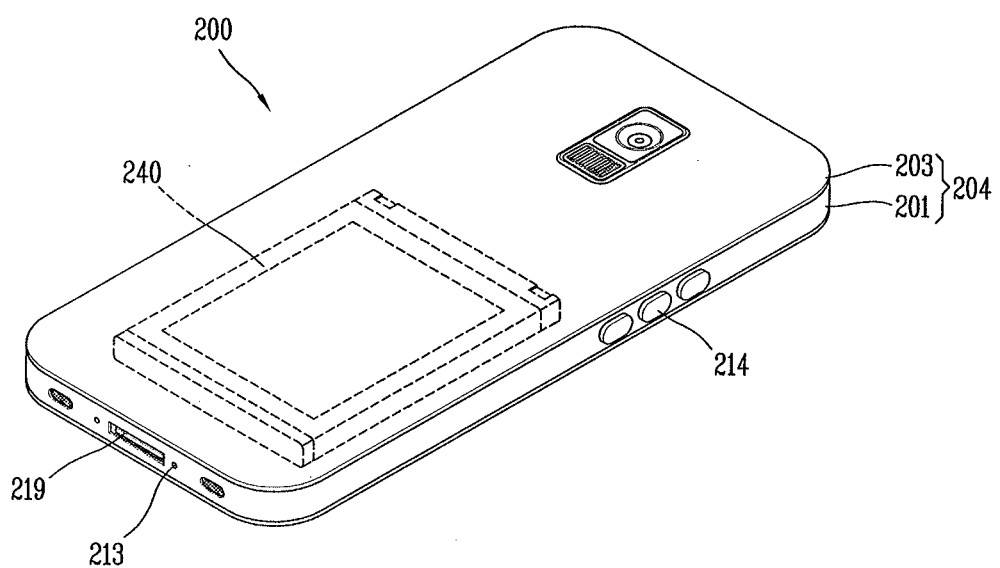
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention is provided with a bar type terminal body 204. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display 210, a first audio output unit 211, a front camera 216, a side key 214, an interface unit 215, and a signal input unit 217.

The display 210 includes a liquid crystal display (LCD) module, organic light emitting diodes (OLED) module, e-paper, etc., each for visually displaying information. The display 210 may include a touch sensing means for inputting information in a touch manner. Hereinafter, the display 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
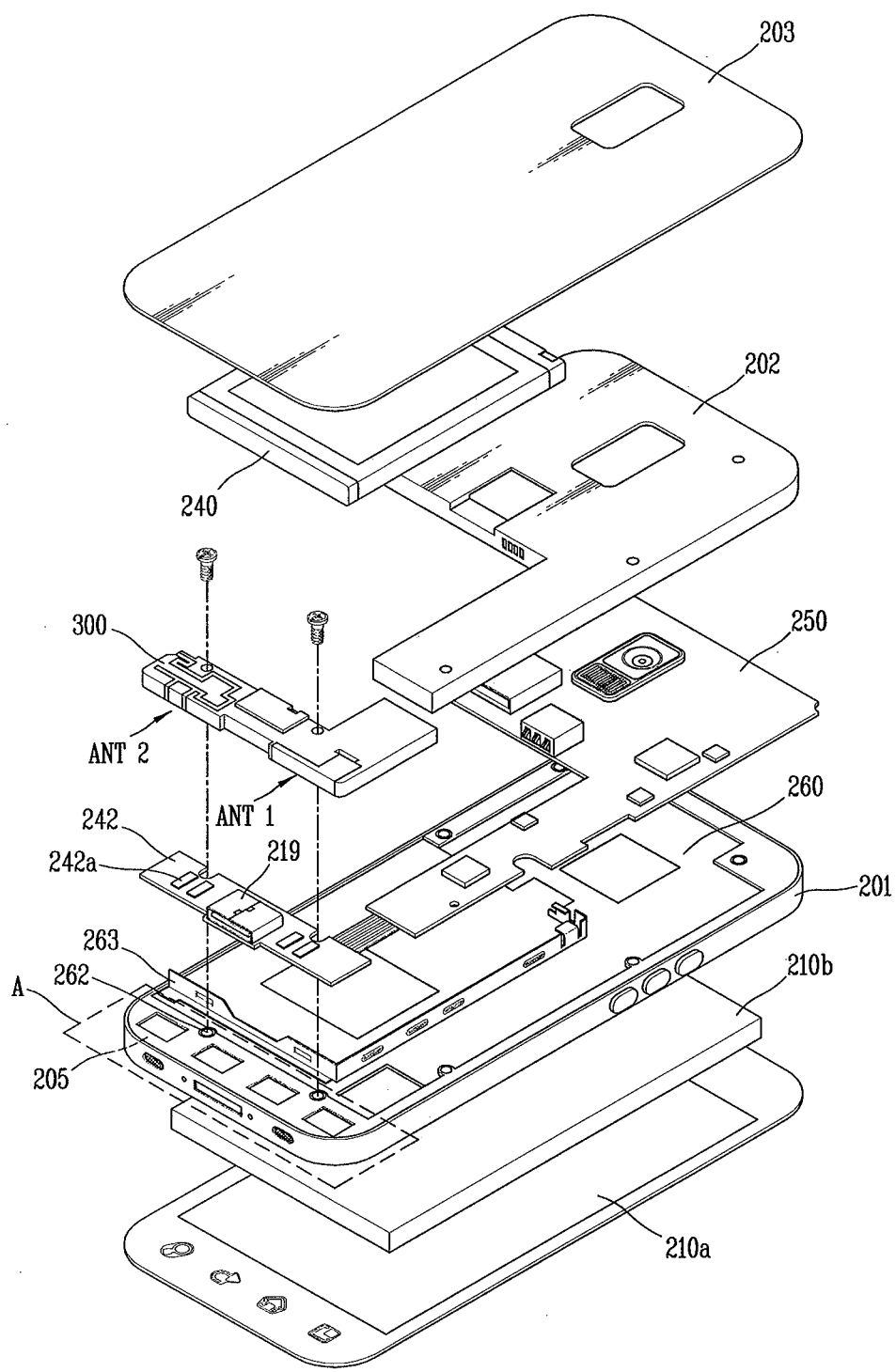
FIG. 4 is an exploded perspective view of the mobile terminal of FIG. 3.

FIG. 4 is an exploded perspective view of the mobile terminal of FIG. 3.

Referring to FIG. 4, the mobile terminal includes a window 210a and a display module 210b which constitute the display 210. The window 210a may be coupled to one surface of the front case 201. The window 210a and the display module 210b may be integrally formed with each other.

A frame 260 is formed between the front case 201 and the rear case 202 so as to support electric devices. The frame 260, a structure for supporting the inside of the mobile terminal, is formed so as to support at least one of the display module 210b, the camera module 221, the antenna device, the battery 240 and a circuit board 250.

Part of the frame 260 may be exposed to the outside of the mobile terminal. The frame 260 may constitute part of a sliding module for connecting a body part with a display part in a slide type mobile terminal rather than a bar type mobile terminal.

Referring to FIG. 4, the circuit board 250 is disposed between the frame 260 and the rear case 202, and the display module 210b is coupled to one surface of the frame 260. The circuit board 250 and the battery may be disposed on another surface of the frame 260, a battery case 203 for covering the battery may be coupled to the rear case 202.

The window 210a is coupled to one surface of the front case 201. A touch sensing pattern 210c for sensing a touch input may be formed on one surface of the window 210a. The touch sensing pattern 210c is configured to sense a touch input, and is formed of a transmissive material. The touch sensing pattern 210c may be mounted to the front surface of the window 210a, and may be configured to convert a change of a voltage, etc. occurring on a specific part of the window 210a, into an electric input signal.

The display module 210b is mounted to the rear surface of the window 210a. In this embodiment, the display module 210b is implemented as a thin film transistor-liquid crystal display (TFT LCD). However, the present invention is not limited to this.

For instance, the display module 210b may be implemented as a liquid crystal display (LCD), an organic light-emitting diode (OLED), a flexible display, a 3D display, etc.

As aforementioned, the circuit board 250 may be formed on one surface of the frame 260, but may be mounted below the display module 210b. At least one electronic device is mounted onto the lower surface of the circuit board 250.

A battery accommodation portion for accommodating the battery 240 therein is recessed from the frame 260. A contact terminal connected to the circuit board 250 may be formed on one side surface of the battery, so that the battery 240 can supply power to the terminal body.

An antenna device may be formed on an upper end or a lower end of the mobile terminal. The antenna device may be formed in plurality in number, and the plurality of antenna devices may be disposed at the respective ends. Each antenna device may be configured to transmit and receive radio signals in different frequency bands. Such antenna device may include a conductive member 310 (refer to FIG. 6A) formed on one surface of a carrier 390 (refer to FIG. 6A). For instance, the carrier 390 having the conductive member 310 formed thereon may be mounted to part 'A' in FIG. 4. The carrier 390 may be coupled to part 'A' of the front case 201 by a coupling means such as a screw. Here, the screw may be coupled to a hole of the front case 201 via a through-hole of the carrier 390. A rib 263 of the frame 260 to be later explained may define a space where the carrier 390 is mounted.

The frame 260 may be formed of a metallic material so as to have a sufficient strength even in a small thickness. The frame 260 formed of a metallic material may operate as a ground. That is, the circuit board 250 or the antenna device may be ground-connected to the frame 260, and the frame 260 may operate as a ground of the circuit board 250 or the antenna device. In this case, the frame 260 may extend a ground of the mobile terminal.

The circuit board 250 is electrically connected to the antenna device, and is configured to process radio signals (or radio electromagnetic waves) transmitted and received by the antenna device. For processing of radio signals, a plurality of transceiving circuits may be mounted to the circuit board 250.

The transceiving circuits may include one or more integrated circuits and related electric devices. As an example, the transceiving circuits may include a transmission integrated circuit, a reception integrated circuit, a switching circuit, an amplifier, etc.

As the plurality of transceiving circuits simultaneously feed conductive members formed in conductive patterns, a plurality of antenna devices may simultaneously operate. For instance, while one of the transceiving circuits performs signal transmission, another may perform signal reception. Alternatively, both of the transceiving circuits may perform signal transmission or signal reception.

A coaxial cable may be formed to connect the circuit board with each antenna device. For instance, the coaxial cable may be connected to feeding devices for feeding antenna devices. The feeding devices may be formed on one surface of a flexible printed circuit board (FPCB) 242 for processing signals input from the user input unit 217. Another surface of the FPCB may be coupled to a signal transmission unit for transmitting signals of the user input unit 217. In this case, a dome may be formed on another surface of the FPCB 242, and an actuator may be formed at the signal transmission unit.

Antenna devices (ANT1, ANT2) may be formed on one side and another side of the carrier 390, respectively. The antenna devices (ANT1, ANT2) are configured to transceive signals in different frequency bands.

For instance, the first antenna device (ANT1) may be configured to transceive DCN 1x type or PCS 1x type signals, and the second antenna device (ANT2) may be configured to transceiver DCN EVDO (Evolution-Data Optimized or Evolution-Data Only) type signals.

If the first antenna device (ANT1) transceives LTE B4 type signals, the second antenna device (ANT 2) may transceive LTE B13 type signals.

Alternatively, if the first antenna device (ANT1) transceives signals corresponding to voice service of the mobile terminal, the second antenna device (ANT 2) may transceive data signals corresponding to LTE service of the mobile terminal.

The FPCB 242 is connected to a lower part of the carrier 390. One end of the FPCB 242 may be connected to a circuit board 250 having a controller. The FPCB 242 may be connected to the user input unit 217 of the mobile terminal. In this case, the FPCB 242 is formed so that signals generated from the user input unit 217 can be transmitted to the controller of the circuit board 250. For instance, the FPCB 242 may be formed below the user input unit 217 so as to be connected to the user input unit 217. And, the FPCB 242 may be formed to contact the signal transmission unit 217a disposed between the user input unit 217 and the FPCB 242.

The FPCB 242 may be formed so that one surface thereof can contact the user input unit 217. Contact portions 242a may be formed on another surface of the FPCB 242, so as to be connected to a feeding connector (F) and a grounding connector (G) of the first antenna device (ANT1) and the second antenna device (ANT2), respectively.

Figure 5A:
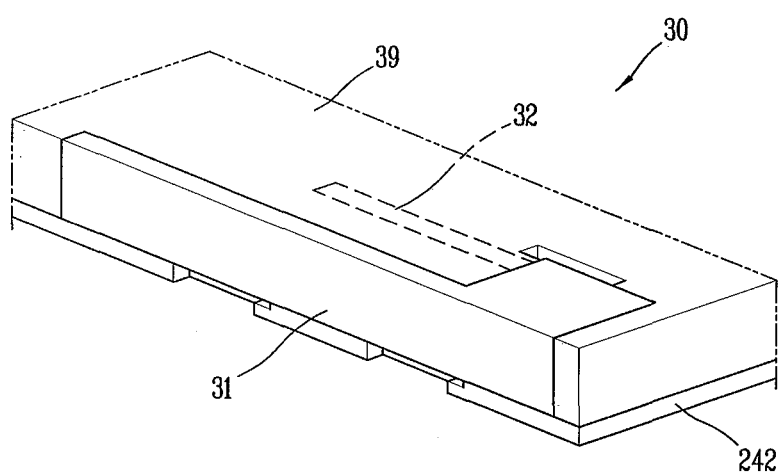
FIG. 5A is a perspective view of an antenna device according to a comparative embodiment.
Figure 5B:
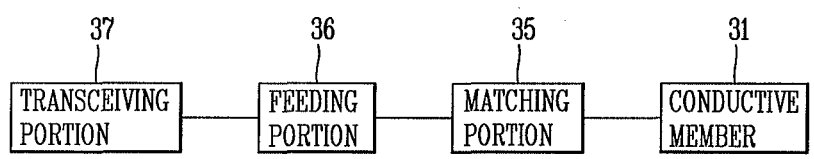
FIG. 5B is a conceptual view of the antenna device of FIG. 5A.
Figure 5C:
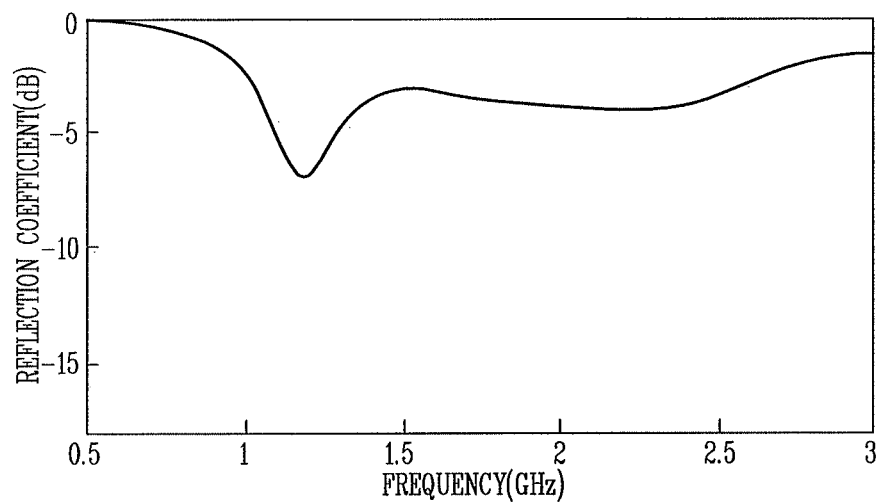
FIGS. 5C and 5D are views showing reflection efficiency, resistance and reactance according to a frequency of the antenna device of FIG. 5A.
Figure 5D:
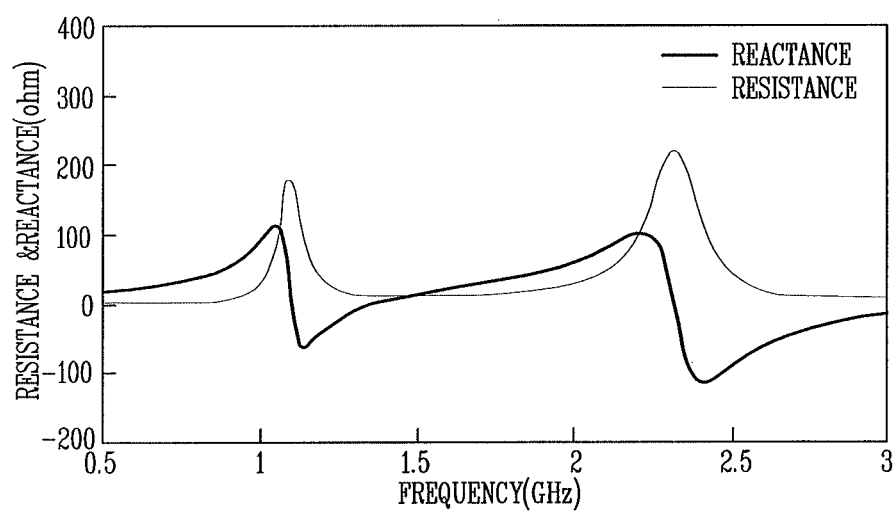

FIG. 5A is a perspective view of an antenna device according to a comparative embodiment, FIG. 5B is a conceptual view of the antenna device of FIG. 5A, and FIGS. 5C and 5D are views showing reflection efficiency, resistance and reactance according to a frequency of the antenna device of FIG. 5A.

Referring to FIG. 5A, an antenna device 30 is a PIFA type antenna device implemented as a conductive member 31 not having a branch 32. A feeding connector (F) to which a signal is input from a substrate, and a grounding connector (G) connected to a ground of the substrate, may be formed at one end of the conductive member 31. The branch 32 indicates part diverged from the conductive member 31 so as to form an additional resonant frequency.

If the conductive member 31 is formed in a single pattern without the branch 32, current flows in a single direction, from one end of the conductive member 31 where feeding and grounding are performed, to another end of the conductive member 31 where radio signals are radiated. If the current flows in a single direction, an electric field or a magnetic field around the antenna device has a simple pattern. This can enhance a user's specific absorption rate (SAR). That is, there occurs no drastic change of current which flows along the conductive member 31.

The conductive member 31 may be formed to have a constant length so that a resonant frequency of the antenna device can be a desired frequency in a resonance mode of $\lambda/4$ or $\lambda/8$. A matching portion 35, a feeding portion 36 and a transceiving portion 37 are electrically connected to the conductive member 31.

Even if the matching portion 35 for impedance matching is coupled to the conductive member 31, an antenna performance can be implemented only at a single frequency (about 1.2 GHz) as shown in FIG. 5B. That is, an antenna device according to a comparative embodiment has an antenna characteristic only in a single frequency band. As a result, it is difficult to implement an antenna device which operates in a plurality of frequency bands.

In order to operate the antenna device in a plurality of frequency bands, a branch member diverged from the conductive member 31 should be provided at part of the conductive member 31. As the branch member is added to the antenna device, the antenna device may have an additional resonant frequency. Such additional resonant frequency may be variable according to the length of the branch member, etc.

In order to expand a bandwidth in a low frequency band, as shown in the dotted line of FIG. 5A, a new conductive member 31 may be diverged from the existing conductive member 31, for an additional resonant frequency. However, in this case, radiation efficiency of the antenna device may be lowered, because current flowing on the conductive member 31 is diverged along the branch member. Lowering of the radiation efficiency influences on a bandwidth. Therefore, a desired antenna performance cannot be implemented merely by a new branch member. The new branch member may lower a user's specific absorption rate (SAR), due to change of a magnetic field or an electric field, occurring from that current is applied to the conductive member 31 in different directions.

FIGS. 5C and 5D are views showing reflection efficiency, resistance and reactance according to a frequency of the antenna device of FIG. 5A. That is, in a comparative embodiment, the matching portion 35 is implemented as a shunt element, for impedance matching of the conductive member 31. FIGS. 5 and 6 will be understood with explanations on FIGS. 6C and 6D.

An antenna device 300 according to the present invention is implemented as a conductive member having a branch. However, the antenna device 300 may operate in a plurality of frequency bands, which will be explained in more detail.

Figure 6A:
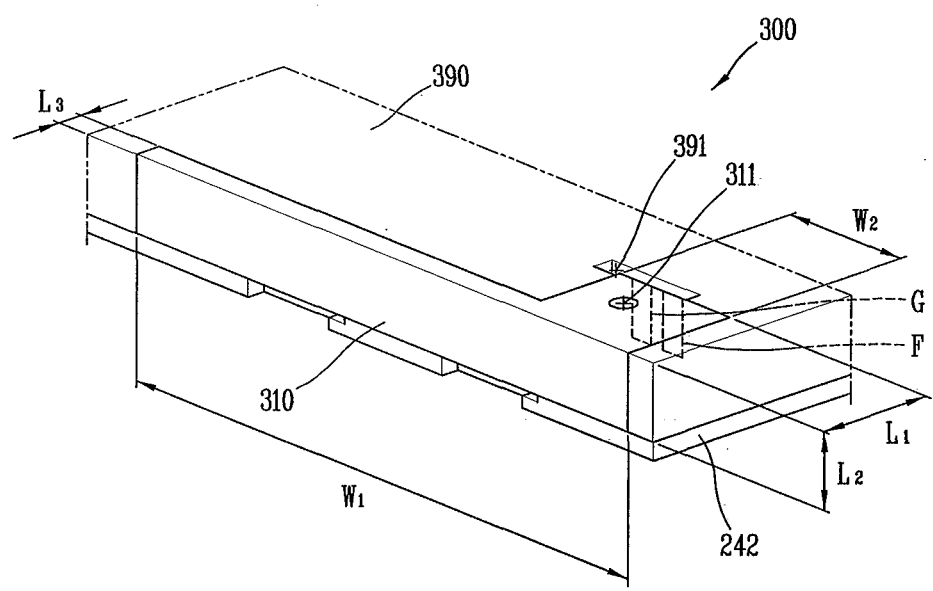
FIG. 6A is a perspective view of an antenna device according to an embodiment of the present invention.
Figure 6B:
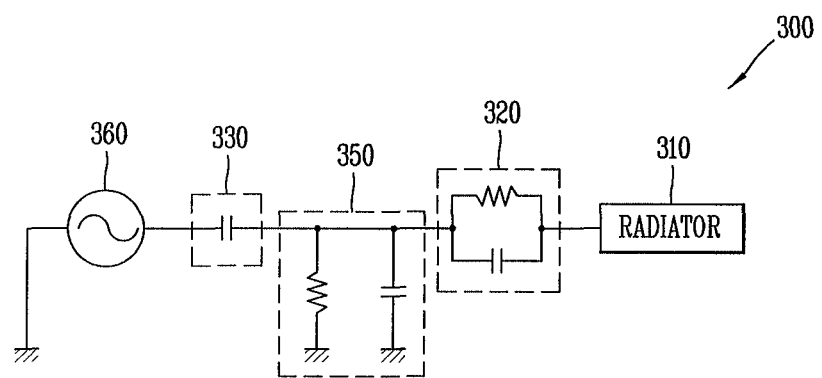
FIG. 6B is a conceptual view of the antenna device of FIG. 6A.
Figure 6C:
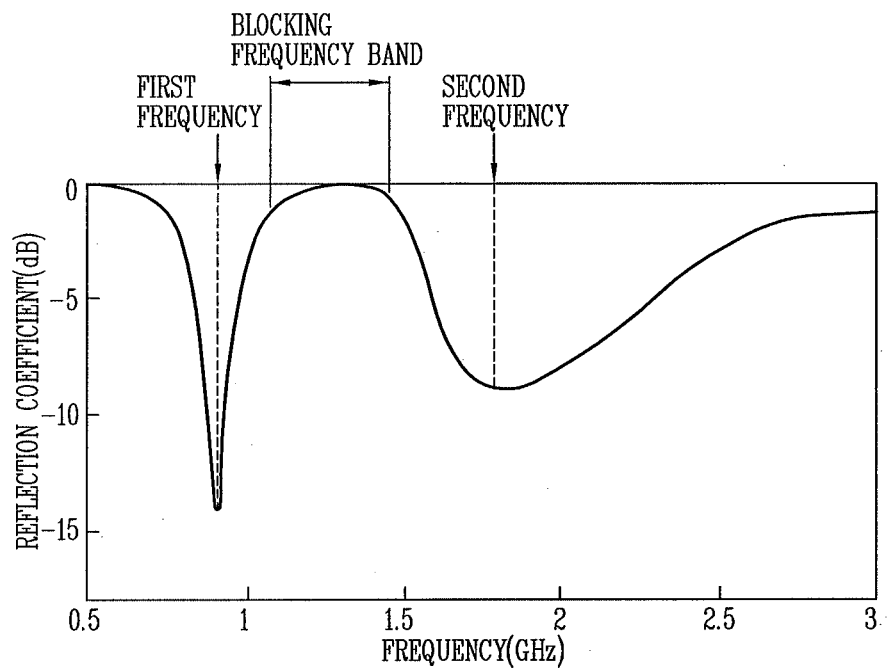
FIGS. 6C and 6D are views showing reflection efficiency, resistance and reactance according to a frequency of the antenna device of FIG. 6A.
Figure 6D:
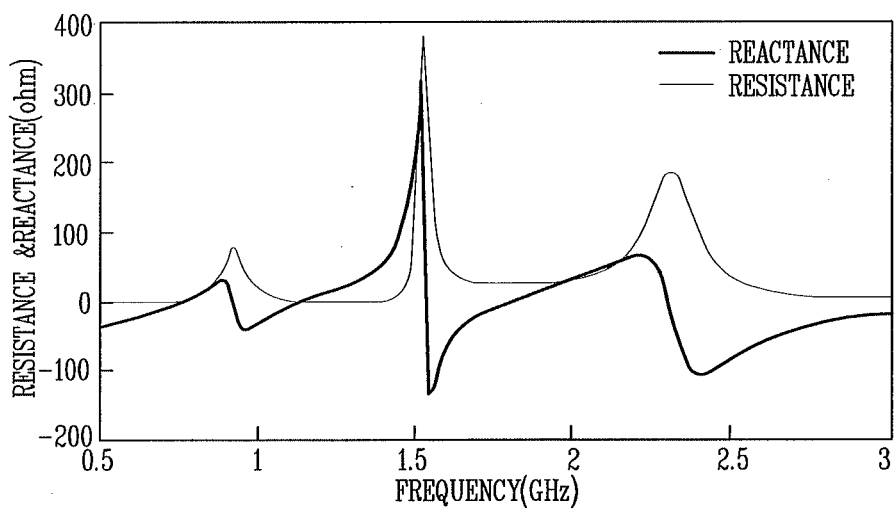

FIG. 6A is a perspective view of an antenna device according to an embodiment of the present invention, FIG. 6B is a conceptual view of the antenna device of FIG. 6A, and FIGS. 6C and 6D are views showing reflection efficiency, resistance and reactance according to a frequency of the antenna device of FIG. 6A.

The antenna device 300 includes a conductive member 310, and at least a blocking part 320 or 330.

The conductive member 310 may be formed in a single pattern having no branch. The conductive member 310 may be printed or formed on one surface of the carrier 390. A feeding connector (F) and a grounding connector (G) are formed at one end of the conductive member 310. The feeding connector (F) and the grounding connector (G) may be spaced from each other. Another end of the conductive member serves as a radiation region of radio signals, due to weak current flowing thereon. As aforementioned, the conductive member 310 is provided with no branch so that current can flow in a single direction, from one end of the conductive member where feeding and grounding are performed, to another end of the conductive member where radio signals are radiated. Since the conductive member 310 has no branch, part of a conductive case which forms the appearance of the mobile terminal may be utilized as the conductive member 310. Here, the conductive case is formed to cover at least one side of the terminal body.

In a case where the antenna device resonates at a first frequency and a second frequency, the blocking portions 320 and 330 serve to mismatch impedance in a frequency band adjacent to the first frequency or the second frequency. The blocking portion may be disposed between the conductive member 310 and a feeding portion 360, in at least one in number. In a case where the blocking portion is formed in plurality in number, the blocking portions may block radio signals which are transceived at a plurality of frequencies, by mismatching impedance in a frequency band consisting of the plurality of frequencies. For instance, the first blocking portion 320 is configured to mismatch impedance in a frequency band of about 1 GHz~1.5 GHz, and the second blocking portion 330 is configured to mismatch impedance in a frequency band less than about 0.7 GHz.

Here, blocking indicates impedance mismatching in a blocking frequency band. The impedance mismatching means that capacitors or inductors of the blocking portions 320 and 330 are tuned so that a reflection coefficient of the antenna device can be close to 0 dB in a blocking frequency band.

The blocking portions 320 and 330 may be implemented as conductive patterns, on one surface of the circuit board 250 or the FPCB 242. The conductive patterns may serve as capacitors or inductors. Alternatively, the blocking portions 320 and 330 may be implemented as lumped-elements which serve as capacitors or inductors.

Hereinafter, will be explained a case where capacitors or inductors of the blocking portions 320 and 330 are implemented as lumped-elements.

The blocking portions 320 and 330 implemented through a combination of capacitors or inductors may operate as shunt elements or series elements. If the blocking portions 320 and 330 are implemented as shunt elements, a resistance component, the real part of impedance can be controlled. For instance, the inductor may have an increased resistance and the capacitor may have a decreased resistance, thereby being tuned for impedance mismatching in a third frequency band. If the blocking portions 320 and 330 are implemented as shunt elements, radio signals in the third frequency band are transmitted to the ground.

On the other hand, if the blocking portions 320 and 330 are implemented as series elements, a reactance component, the imaginary part of impedance can be controlled. For instance, the inductor may have an increased reactance, and the capacitor may have a decreased reactance, thereby being tuned for impedance mismatching in a third frequency band. If the blocking portions 320 and 330 are implemented as series elements, radio signals corresponding to the third frequency band are reflected.

Alternatively, the blocking portions 320 and 330 may be implemented through a combination of the shunt elements or the series elements.

As aforementioned, the first blocking portion 320 is configured to mismatch impedance in a third frequency band of about 1 GHz~1.5 GHz. As a result, antenna efficiency is enhanced at a first frequency and a second frequency, i.e., at neighboring frequencies. That is, reflection efficiency and a bandwidth are enhanced in a frequency band where the center frequency is a first frequency, and in a frequency band where the center frequency is a second frequency. If the first blocking portion 320 mismatches impedance in a third frequency band between a first frequency and a second frequency, an antenna characteristic is enhanced at the neighboring first and second frequencies. This has been firstly proposed by the present inventors, which is called a balloon effect. A balloon has a following characteristic. If a central part of the balloon is pressed, two sides thereof swell by the pressure. In the present invention, if impedance is mismatched in a specific frequency band, an antenna characteristic is enhanced at frequencies on two sides of a mismatched frequency band. Therefore, the effect of the present invention is called a balloon effect.

The balloon effect not only enhances an antenna characteristic at frequencies on two sides of a mismatched frequency band, but also implements a frequency shift effect that resonant frequencies are shifted toward a low frequency or a high frequency. Accordingly, a low resonant frequency can be implemented by the conductive member 310 having a relatively short length. For instance, for a resonant frequency of 700 MHz, the conductive member 310 is formed to have a length of 50 mm in the conventional art. However, in the present invention, a resonant frequency of 700 MHz can be generated by the conductive member 310 having a length of 30 mm, and an antenna characteristic can be enhanced.

Besides the balloon effect, a body effect can be reduced. The body effect indicates that an antenna characteristic changes when a specific part of the mobile terminal contacts or approaches to the human body. For instance, when a specific part of the mobile terminal is held by a user's hand, a receiving rate with respect to radio signals is lowered, which is called 'death grip'. Since the blocking portions 320 and 330 block radio signals by mismatching impedance in a predetermined frequency band, can be prevented frequency shift resulting from that the antenna device has change in impedance or a magnetic field or an electric field due to contact to a user's body. That is, when the human body contacts or approaches to the mobile terminal, a first frequency or a second frequency may move to a blocking frequency band. However, such problem can be prevented by the blocking portions 320 and 330 for preventing a first frequency or a second frequency from moving to a blocking frequency band. As the antenna device is provided with the blocking portions 320 and 330, lowering of an antenna characteristic due to a body effect can be reduced.

For instance, since the first blocking portion is configured to block signals that are in a third frequency band, a first frequency or a second frequency is prevented from moving to a third frequency band. Further, can be implemented a frequency shift effect that resonant frequencies are shifted toward a low frequency or a high frequency. Under such configuration, a low frequency resonance can be implemented using the conductive member 310 having a relatively shorter length.

Further, since the second blocking portion blocks signals that are in a frequency band lower than the first frequency, the first frequency is prevented from moving. Further, since an antenna characteristic at a neighboring frequency is enhanced by the balloon effect, a bandwidth can be enhanced in a signal band where the center frequency is the first frequency. Besides, since signals transceived by an antenna which operates in a relatively lower frequency band are blocked, an isolation characteristic can be enhanced.

The configurations of the blocking portions 320, 330 and the conductive member 310 will be explained with comparing FIGS. 6C and 6D with FIGS. 5C and 5D. FIGS. 6C and 6D are views showing reflection efficiency, resistance and reactance, each measured using the conductive member 310 and the blocking portions 320 and 330 of FIGS. 6A and 6B.

In the comparative and preferred embodiments, used are conductive members 31 and 310 having the same size. The conductive members 31 and 310 are formed to have W1 of 28 mm, W2 of 6 mm, L1 of 5 mm, L2 of 3.3 mm, and L3 of 1 mm.

In the preferred embodiment, the antenna device is provided with the first blocking portion 320 and the second blocking portion 330. The first blocking portion 320 is a series device serially-connected to the conductive member 310, which includes an inductor having inductance of 4.5 nH and a capacitor having capacitance of 3.0 pF. A matching portion 350 is implemented as a shunt element, which includes an inductor having inductance of 3.9 nH and a capacitor having capacitance of 0.6 pF. In order to enhance an antenna performance in a low frequency band (about 900 MHz) between a feeding portion 360 and the matching portion 350, the second blocking portion 330 is implemented. The second blocking portion 330 is configured as a series capacitor which has capacitance of 5.6 pF.

In the comparative embodiment, only a matching portion 35 was used. More specifically, the matching portion 35 was configured as a shunt element, and used was a device including an inductor having inductance of 3.9 nH, and a capacitor having capacitance of 0.6 pF.

The values of the inductor and the capacitor and the size of the conductive members 31, 310 are merely exemplary, which are variable for a more enhanced antenna.

As shown in FIGS. 5C and 5D, in the comparative embodiment, the conductive member 31 having the same length as the conductive member 310 of the preferred embodiment resonates once at a low frequency of about 1.2 GHz, and resonates once at a high frequency of about 2.25 GHz. On the contrary, in the preferred embodiment where the blocking portions 320 and 330 are implemented, as shown in FIG. 6C, resonance occurs at a low frequency of about 0.8 GHz, and resonance having a wide bandwidth occurs in a high frequency band of 1.7~2.4 GHz. This results from the balloon effect occurring as the first blocking portion 320 mismatches impedance in a frequency band of about 1~1.5 GHz. Here, impedance mismatching means tuning values of a capacitor or an inductor of the first blocking portion 320, so that a reflection coefficient can be close to 0 dB in a frequency band of about 1~1.5 GHz, for the balloon effect.

As shown in FIG. 6C, due to the first blocking portion, the reflection coefficient was increased to −19 dB (preferred embodiment) from −7 dB (comparative embodiment) at a low frequency, and was increased to −10 dB (preferred embodiment) from −4.5 dB (comparative embodiment) in a high frequency band.

Further, the center frequency in a low frequency band was moved to about 0.9 GHz (preferred embodiment) from about 1.2 GHz (comparative embodiment), by the frequency shift due to the balloon effect.

Since the antenna device according to the preferred embodiment is provided with the blocking portions 320 and 330, an antenna performance can be enhanced, and multi-resonance can be implemented at a plurality of frequencies without having branches.

Figure 6E:
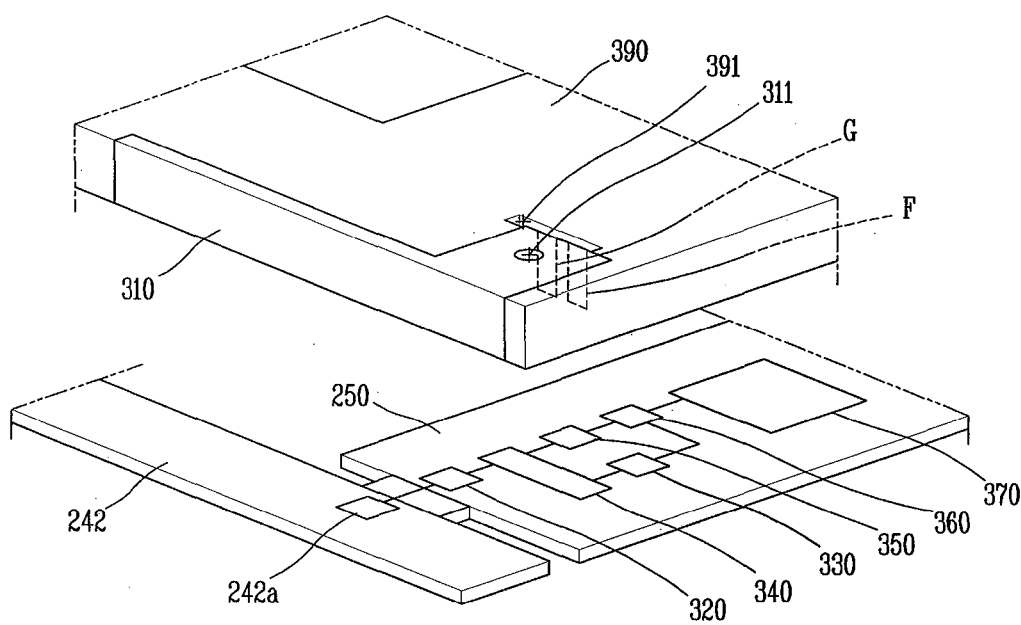
FIG. 6E is an exploded perspective view of the antenna device of FIG. 6A.
Figure 6F:
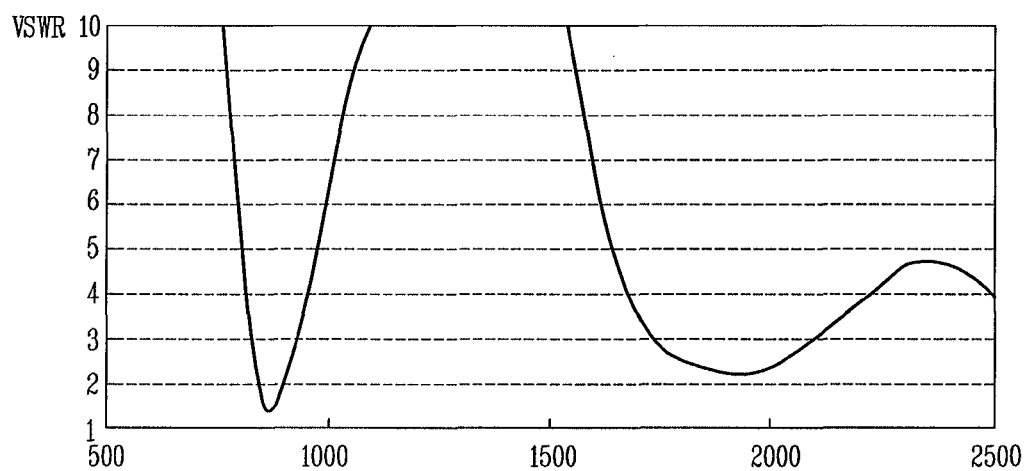
FIG. 6F is a view showing a voltage standing wave ratio (VSWR) according to a frequency of the antenna device of FIG. 6A.

FIG. 6E is an exploded perspective view of the antenna device of FIG. 6A, and FIG. 6F is a view showing a voltage standing wave ratio (VSWR) according to a frequency of the antenna device of FIG. 6A.

The antenna device according to the preferred embodiment of the present invention will be explained with reference to FIGS. 6A and 6E.

The conductive member 310 may be formed on a plurality of side surfaces of a carrier 390. The conductive member 310 may be provided or may not be provided with branches. In case of having branches, the conductive member 310 may be formed so that current flowing therealong can be diverged to the minimum. Further, the conductive member 310 may be provided with at least one hole 311 penetratingly-formed thereat. Such hole may be formed at a position where the strongest current flows along the conductive member 310. Since the hole 311 controls current flow along the conductive member 310, an antenna characteristic such as a reflection coefficient can be enhanced.

A through hole 391 may be penetratingly-formed at the carrier 390. Contact portions 242a may be formed below the through hole 391. The contact portions 242a may be formed on a substrate 242. The contact portions 242a may be connected to a feeding connector (F) and a grounding connector (G) formed at one end of the conductive member 310, respectively. The conductive member 310 may extend along the through hole 391.

The carrier 390 is a dielectric substance having a dielectric constant, which may be implemented as FR-3 and CEM-1. The FR-3 is made of multiple plies of paper that have been impregnated with an epoxy-resin binder, and the CEM-1 is a composite material that has a paper core impregnated with epoxy resin. Alternatively, the carrier 390 may be implemented as CEM-3, FR-4, FR-5, GI. The CEM-3 impregnated with epoxy resin has woven glass cloth surfaces, and a core of non-woven matte fiberglass. The FR-4 is constructed on multiple plies of epoxy-resin impregnated woven glass cloth. The FR-5 is constructed on multiple plies of reinforced epoxy-resin impregnated woven glass cloth. The GI is constructed on multiple plies of polyimide-resin impregnated woven glass cloth.

The feeding connector (F) is configured to electrically connect the feeding portion 360 with the conductive member 310, and the feeding portion 360 is configured to feed the conductive member 310 in an EM (Electro-Magnetic) feeding manner. To this end, the feeding connector (F) may include at least one of a feeding board, a feeding clip and a feeding line. As one of the feeding board, the feeding clip and the feeding line is electrically connected to another, current (or voltage) supplied from a feeding device is transferred to the conductive member 310 which transceives (transmits and receives) radio signals. Here, the feeding line may include a microstrip printed onto a substrate.

The grounding connector (G) is configured to ground-connect the conductive member 310 to a ground, and to perform electrical short, thereby executing impedance matching with respect to a resonant frequency of the antenna device. The grounding connector (G) may be provided with at least two paths having different lengths, and switches corresponding to the respective paths. The respective paths connect a ground and a radiator (e.g., the conductive member 310) with each other, in different lengths, by switches thereof. The path serves as an electric passage for connecting a ground with a radiator, which may include at least one of a feeding board, a feeding clip and feeding lines. As feeding lines are formed in different lengths, the paths may have different lengths.

A blocking portion 320 may be formed between the contact portion and the feeding portion 360, and a connection portion 340 may be formed between the blocking portion 320 and the feeding portion 360. The connection portion 340 for distinguishing the blocking portion 320 from the matching portion 350, may be formed as a conductive line. The matching portion 350 may be formed between the connection portion 340 and the feeding portion 360, and a blocking portion 330 may be formed between the connection portion 340 and the feeding portion 360. More specifically, the first blocking portion 320 may be formed between the contact portions 242a and the connection portion 340, and the second blocking portion 330 may be formed between the connection portion 340 and the feeding portion 360. As aforementioned, the first blocking portion 320 may be configured to mismatch impedance in a third frequency band between a first frequency and a second frequency so that the antenna device can multi-resonate between the first and second frequencies. And, the second blocking portion 330 may be configured to enhance an antenna characteristic at a first frequency by mismatching impedance in a frequency band lower than the first frequency.

The matching portion 350 may be implemented as a series device or shunt elements. If the matching portion 350 is implemented as a series device, a reactance component, the imaginary part of impedance can be changed. For instance, an inductor may have an increased reactance, and a capacitor may have a decreased reactance, so that impedance can be changed in a specific frequency band.

On the other hand, if the matching portion 350 is implemented as a shunt element, a resistance component, the real part of impedance can be changed. For instance, an inductor may have an increased resistance, and a capacitor may have a decreased resistance, so that impedance can be changed in a specific frequency band.

The feeding portion 360 may be implemented through a combination of a balun, a phase shifter, a distributor, an attenuator, an amplifier, etc.

In the preferred embodiment, a substrate is implemented as the flexible printed circuit board (FPCB) 242. Alternatively, the substrate may be implemented as a circuit board 250 rather than the FPCB 242. The substrate may be a dielectric substrate or a semiconductor substrate, and may have a ground on one surface thereof. In a case where the substrate is a multi-layered substrate, one of a plurality of layers may be a ground. One end of the conductive member 310 may be connected to the ground according to an antenna type.

A transceiving circuit 370 may be formed on one surface of the circuit board 250. The transceiving circuit 370 is connected to the feeding portion 360. The transceiving circuit 370 is configured to transmit radio signals by feeding the conductive member 310 by the feeding portion 360 and the matching portion 350, or to transmit radio signals received by the conductive member 310 to the matching portion 350 and the feeding portion 360 for frequency conversion or a demodulation process, etc.

As the antenna device is configured as shown in FIG. 6E, an antenna characteristic of FIG. 6F can be implemented. As shown in FIG. 6F, the mobile terminal of the present invention has antenna efficiency in a low frequency band (about 0.8 GHz) and in a high frequency band (about 1.7~2.4 GHz). That is, the antenna device according to the preferred embodiment of the present invention has a voltage standing wave ratio (VSWR) less than 3:1 in a low frequency band (about 0.8 GHz) and in a high frequency band (about 1.7~2.4 GHz), respectively, and has a sufficient bandwidth in a high frequency band.

Figure 7A:
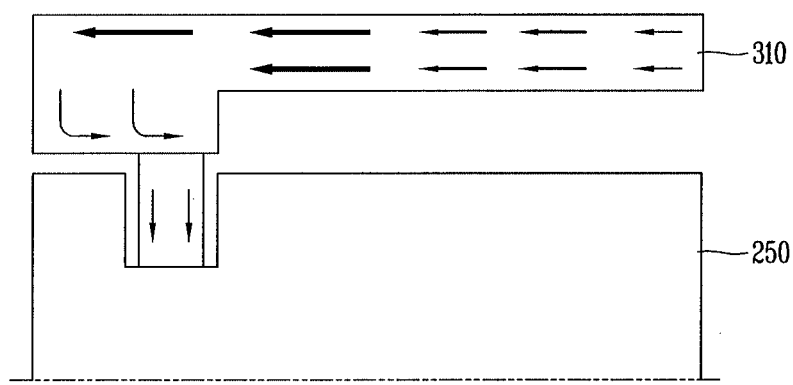
FIGS. 7A to 7C are views showing simulation results on current distributions when the antenna device of FIG. 6A operates at frequencies of 900 MHz, 1800 MHz and 2100 MHz, respectively.
Figure 7B:
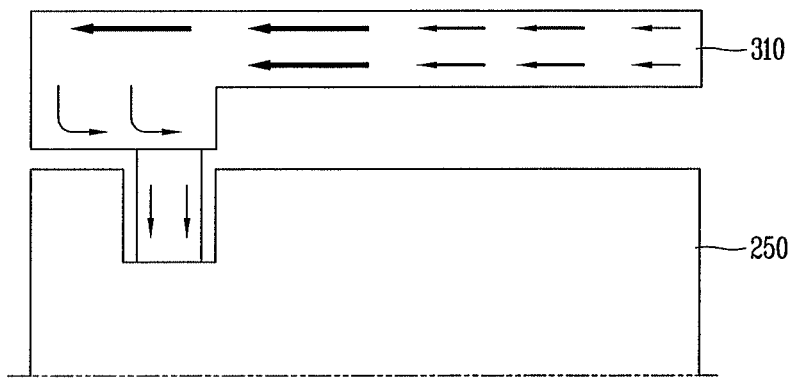
Figure 7C:
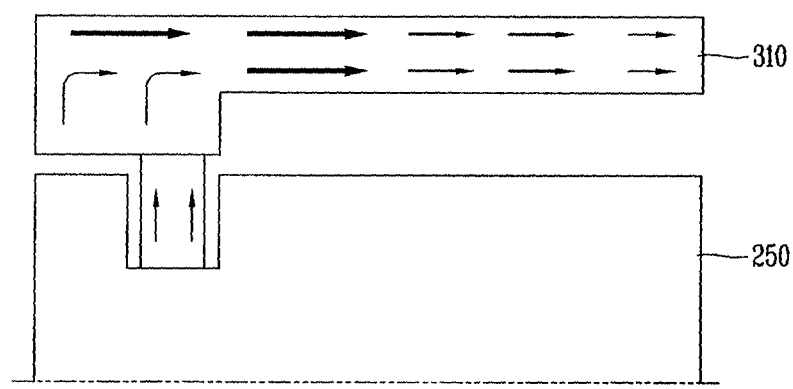

FIGS. 7A to 7C are views showing simulation results on current distributions when the antenna device of FIG. 6A operates at frequencies of 900 MHz (FIG. 7A), 1800 MHz (FIG. 7B) and 2100 MHz (FIG. 7C), respectively. Here, the size of the arrow is proportional to the strength of current. As shown, since the conductive member 310 of the antenna device according to the preferred embodiment is provided with no branch, current flows in a single direction, from one end of the conductive member 310 where feeding and grounding are performed, to another end thereof where radio signals are radiated. If the current flow is simple, an electric field or a magnetic field around the antenna device has a simple pattern. This may enhance a user's specific absorption rate (SAR). That is, current flowing along the conductive member 310 has no drastic change.

Figure 8A:
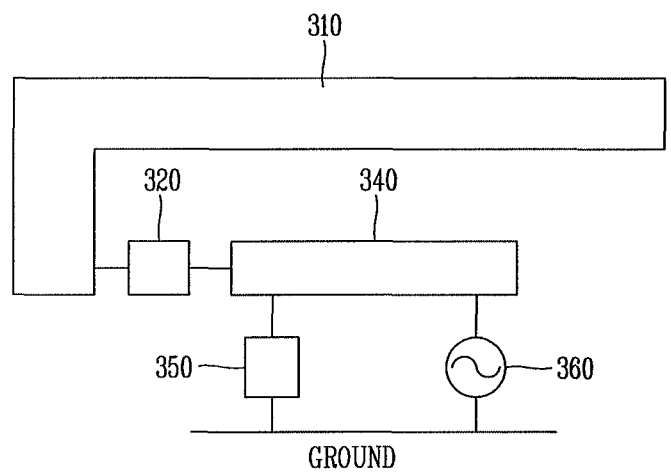
FIGS. 8A to 8C are views showing examples of an antenna device according to a first embodiment of the present invention.
Figure 8B:
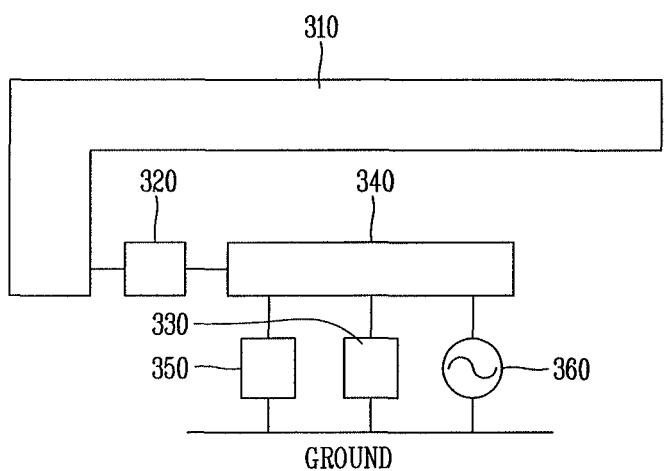
Figure 8C:
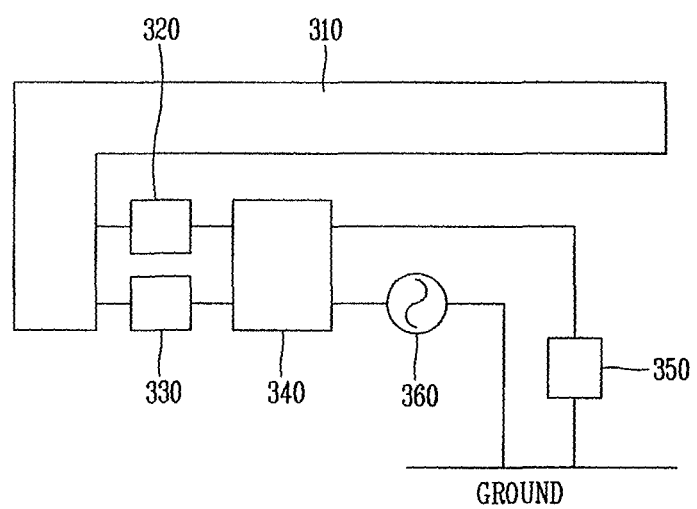

FIGS. 8A to 8C are views showing examples of an antenna device according to a first embodiment of the present invention.

Referring to FIG. 8A, the antenna device includes a conductive member 310, a blocking portion 320, a connection portion 340, a matching portion 350 and a feeding portion 360. Although not shown, the conductive member 310 is connected to a ground of a substrate. As aforementioned, the conductive member 310 is formed to have no branch. The blocking portion 320 is configured to electrically connect the conductive member 310 with the connection portion 340. The matching portion 350 and the feeding portion 360 may be formed between the connection portion 340 and the substrate.

Referring to FIG. 8B, the antenna device includes a conductive member 310, a first blocking portion 320, a connection portion 340, a second blocking portion 330, a matching portion 350 and a feeding portion 360. Although not shown, the conductive member 310 is connected to a ground of a substrate. As aforementioned, the conductive member 310 is formed to have no branch. The first blocking portion 320 is configured to electrically connect the conductive member 310 with the connection portion 340. The second blocking portion 330, the matching portion 350 and the feeding portion 360 may be formed between the connection portion 340 and the substrate.

The first blocking portion 320 may be configured to block radio signals that are between a first frequency (low frequency) and a second frequency (high frequency). And, the second blocking portion 330 may be configured to block radio signals in a frequency band lower than a first frequency, or radio signals in a frequency band higher than a second frequency. For such configuration of the second blocking portion 330, capacitance of a capacitor or inductance of an inductor of the second blocking portion 330 may be changed.

Referring to FIG. 8C, the antenna device includes a conductive member 310, a first blocking portion 320, a connection portion 340, a second blocking portion 330, a matching portion 350 and a feeding portion 360. Although not shown, the conductive member 310 is connected to a ground of a substrate. As aforementioned, the conductive member 310 is formed to have no branch. The first blocking portion 320 and the second blocking portion 330 are configured to electrically connect the conductive member 310 with the connection portion 340. The matching portion 350 and the feeding portion 360 may be formed between the connection portion 340 and the substrate.

The first blocking portion 320 may be configured to block radio signals that are between a first frequency (low frequency) and a second frequency (high frequency). And, the second blocking portion 330 may be configured to block radio signals in a frequency band lower than a first frequency, or radio signals in a frequency band higher than a second frequency. For such configuration of the second blocking portion 330, capacitance of a capacitor or inductance of an inductor of the second blocking portion 330 may be changed.

Figure 9A:
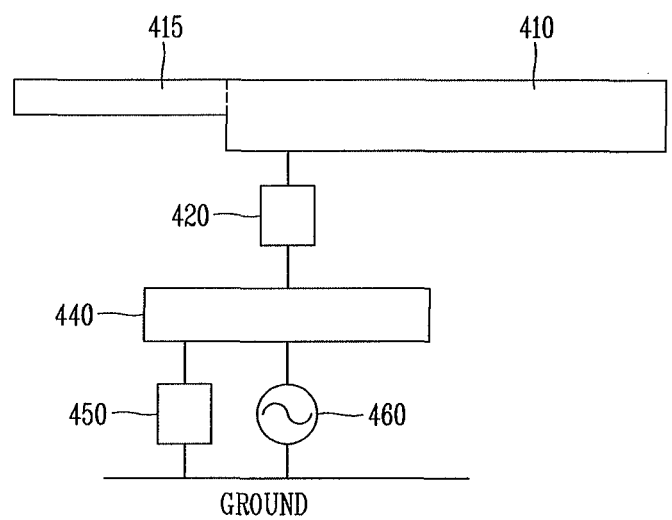
FIGS. 9A to 9C are views showing examples of an antenna device according to a second embodiment of the present invention.
Figure 9B:
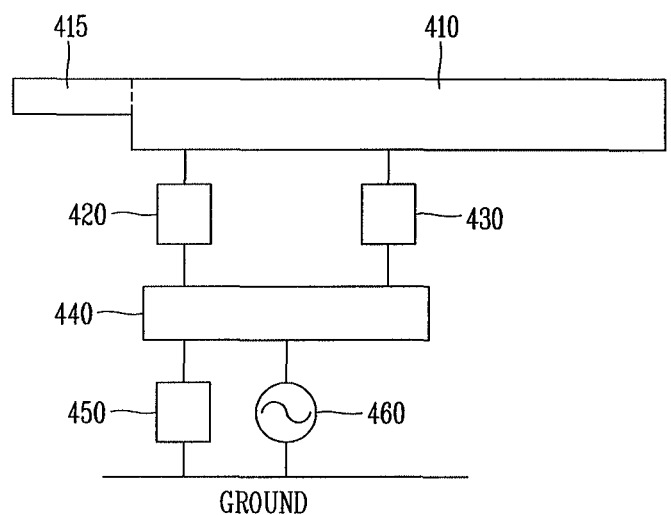
Figure 9C:
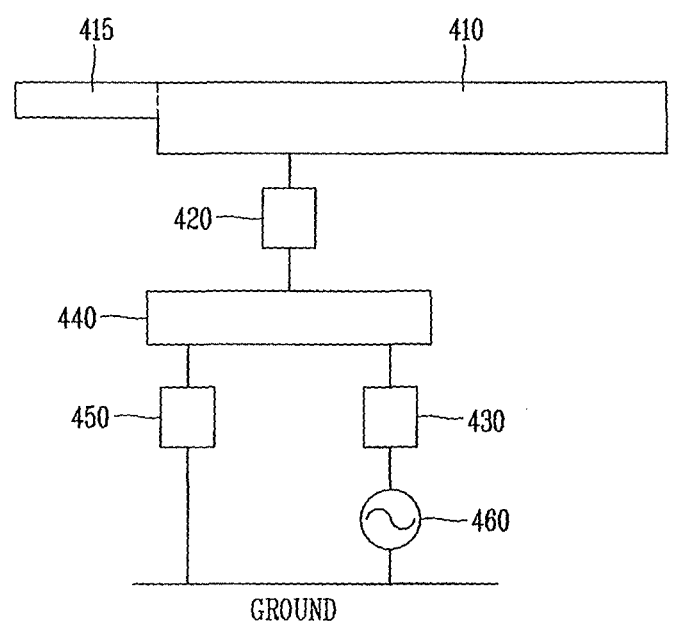

FIGS. 9A to 9C are views showing examples of an antenna device according to a second embodiment of the present invention.

Referring to FIG. 9A, the antenna device includes a conductive member 410, a blocking portion 420, a connection portion 440, a matching portion 450 and a feeding portion 460. Although not shown, the conductive member 410 is connected to a ground of a substrate. The conductive member 410 may be formed to have a branch. The branches may be formed so that current flowing along the conductive member 410 can be branched (diverged) to the minimum. The length of the branch may correspond to the length of an additional resonant frequency.

The blocking portion 420 is configured to electrically connect the conductive member 410 with the connection portion

440. The matching portion 450 and the feeding portion 460 may be formed between the connection portion 440 and the substrate.

Referring to FIG. 9B, the antenna device includes a conductive member 410, a first blocking portion 420, a connection portion 440, a second blocking portion 430, a matching portion 450 and a feeding portion 460. Although not shown, the conductive member 410 is connected to a ground of a substrate. The conductive member 410 may be formed to have a branch. The branches may be formed so that current flowing along the conductive member 410 can be branched (diverged) to the minimum. The length of the branch may correspond to the length of an additional resonant frequency. The first blocking portion 420 and the second blocking portion 430 are configured to electrically connect the conductive member 410 with the connection portion 440. The matching portion 450 and the feeding portion 460 may be formed between the connection portion 440 and the substrate.

The first blocking portion 420 may be configured to block radio signals that are between a first frequency (low frequency) and a second frequency (high frequency). And, the second blocking portion 430 may be configured to block radio signals in a frequency band lower than a first frequency, or radio signals in a frequency band higher than a second frequency. For such configuration of the second blocking portion 430, capacitance of a capacitor or inductance of an inductor of the second blocking portion 430 may be changed.

Referring to FIG. 9C, the antenna device includes a conductive member 410, a first blocking portion 420, a connection portion 440, a second blocking portion 430, a matching portion 450 and a feeding portion 460. Although not shown, the conductive member 410 is connected to a ground of a substrate. The conductive member 410 may be formed to have a branch. The branches may be formed so that current flowing along the conductive member 410 can be branched (diverged) to the minimum. The length of the branch may correspond to the length of an additional resonant frequency. The first blocking portion 420 is configured to electrically connect the conductive member 410 with the connection portion 440. The matching portion 450 and the feeding portion 460 may be formed between the connection portion 440 and the substrate. The second blocking portion 430 may be formed between the connection portion 440 and the feeding portion 460.

The first blocking portion 420 may be configured to block radio signals that are between a first frequency (low frequency) and a second frequency (high frequency). And, the second blocking portion 430 may be configured to block radio signals in a frequency band lower than a first frequency, or radio signals in a frequency band higher than a second frequency. For such configuration of the second blocking portion 430, capacitance of a capacitor or inductance of an inductor of the second blocking portion 430 may be changed.

The mobile terminal according to the present invention can have the following advantages.

Firstly, since the mobile terminal is provided with the blocking portions 320 and 330, an antenna characteristic can be enhanced at a frequency adjacent to a blocking frequency band.

Secondly, an antenna which resonates in a low frequency band can be implemented using a relatively shorter conductive member 310, by a frequency shift effect.

Thirdly, a body effect can be reduced due to a blocking frequency band.

Fourthly, in a case where the conductive member 310 is formed to have no branch, a user's specific absorption rate (SAR) can be lowered.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a conductive member configured to radiate radio signals;
   a first blocking portion configured to mismatch impedance in a third frequency band between a first frequency and a second frequency when the conductive member multi-resonates between the first frequency and the second frequency;
   a feeding portion configured to feed the conductive member;
   a substrate having a ground; and
   a connection portion formed between the conductive member and the substrate, and electrically connected to the substrate,
   wherein the conductive member is formed to have no branch where current applied thereto is branched off,
   wherein the conductive member is formed such that current applied thereto flows in a single direction, from one end to another end, or from another end to one end thereof,
   wherein the first blocking portion is disposed between the feeding portion and the conductive member and the first blocking portion is implemented as a lumped-element having a capacitor or an inductor,
   wherein a hole is penetratingly-formed at the conductive member, and the hole is disposed close to the feeding portion, and
   wherein the conductive member is formed to have a length corresponding to $\lambda/8 \sim \lambda/12$ of the first frequency.

2. The mobile terminal of claim 1, further comprising a second blocking portion formed between the connection portion and the substrate, and configured to mismatch impedance in a frequency band lower than the first frequency.

3. The mobile terminal of claim 2, wherein the second blocking portion is implemented as a lumped-element having a capacitor or an inductor.

4. The mobile terminal of claim 1, further comprising a second blocking portion formed between the connection portion and the substrate, and configured to mismatch impedance in a frequency band higher than the second frequency.

* * * * *